United States Patent
Gaggar et al.

(10) Patent No.: US 6,720,386 B2
(45) Date of Patent: Apr. 13, 2004

(54) WEATHERABLE STYRENIC BLENDS WITH IMPROVED TRANSLUCENCY

(75) Inventors: Satish Kumar Gaggar, Parkersburg, WV (US); Kwan Hongladarom, Parkersburg, WV (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/084,963

(22) Filed: Feb. 28, 2002

(65) Prior Publication Data

US 2003/0162895 A1 Aug. 28, 2003

(51) Int. Cl.⁷ .............................................. C08L 13/00
(52) U.S. Cl. ........................................ 525/85; 525/87
(58) Field of Search ...................... 525/85, 87

(56) References Cited

U.S. PATENT DOCUMENTS

| | | |
|---|---|---|
| 4,351,921 A | 9/1982 | Kishida et al. |
| 4,357,270 A | 11/1982 | Pippa et al. |
| 4,731,414 A | 3/1988 | Ting |
| 5,120,788 A * | 6/1992 | Seitz et al. .................... 525/85 |
| 5,973,074 A | 10/1999 | Campbell et al. |

FOREIGN PATENT DOCUMENTS

| | | |
|---|---|---|
| JP | 52033656 | 3/1977 |
| JP | 59108056 | 6/1984 |
| JP | 62151442 | 7/1987 |

* cited by examiner

Primary Examiner—Jeffrey Mullis

(57) ABSTRACT

Rubber modified weatherable styrenic blends with improved transparency and colorability are disclosed. A matrix phase of poly(alkyl alkylacrylate) and vinyl carboxylic acid ester-vinyl aromatic-vinyl cyanide terpolymer is combined with a rubbery graft phase of a poly(alkyl acrylate) rubber substrate grafted with a vinyl aromatic-vinyl cyanide superstrate copolymer to provide acrylate-styrene-acrylonitrile type (ASA) compositions.

18 Claims, No Drawings

WEATHERABLE STYRENIC BLENDS WITH IMPROVED TRANSLUCENCY

BACKGROUND OF THE INVENTION

1. Field of the Invention

The present invention relates to weatherable styrenics with improved translucency. More particularly, the invention relates to modified acrylate-styrene-acrylonitrile (ASA) plastics with improved translucency for better colorability.

2. Description of the Related Art

ASA polymers (also known as AAS), which are rubber and thermoplastic composites, have long been known and used in various outdoor applications which take advantage of the weatherability of such resins. ASA polymers are in general terpolymers of acrylate, styrene, and acrylonitrile having an excellent combination of impact and weatherability properties. These ASA resins typically contain a grafted crosslinked alkylacrylate rubber phase. Most ASA products consist of a two phase system of a grafted elastomeric terpolymer, acrylate-styrene-acrylonitrile, dispersed in a glassy continuous matrix of styrene-acrylonitrile (SAN) copolymer. The graft typically consists of a polyalkylacrylate rubber core and grafted SAN shell, small amounts of styrene and acrylonitrile being grafted onto the rubber particles to compatibilize the two phases.

In the ASA manufacturing process, three distinct polymerization reactions or stages are involved. First the elastomeric component, typically a polyalkyl acrylate rubber or polyalkyl alkylacrylate rubber, is produced. This phase can be carried out either in a water-based emulsion or in a solution polymerization process. In the second stage, the styrene and acrylonitrile are copolymerized optionally with other monomers and grafted onto the elastomeric phase to achieve the desired compatibility. This stage can be performed either in emulsion, bulk/mass or via suspension and/or the emulsion-suspension process route. In the third stage, styrene and acrylonitrile (and, optionally, other monomers) are copolymerized, either simultaneously with the second (grafting) stage or separately in an independent operation, to form the rigid matrix. Again, this step may involve one or more of the following processes: emulsion, bulk or suspension.

In addition, the ASA materials may be produced by other process techniques such as batch, semibatch and continuous polymerization for reasons of either manufacturing economics or product performance or both.

To alter specific properties of the resulting polymers, other acrylate, monovinylidene aromatic, and ethylenically unsaturated nitrile monomers may be incorporated, either in addition to or in place of the various acrylate-styrene-acrylonitrile components. The physical properties of ASA plastics vary somewhat with their method of manufacture but more so with their composition. Specific performance requirements and extensive material differentiation are achieved by manipulation of monomer composition, microstructure, morphology and/or additives.

However, due to a high level of opacity, weatherable ASA materials are difficult to color match in bright colors and may lack depth of color. In addition, coloring costs are usually high when matches are possible. There remains a need for improved ASA materials which maintain desirable properties which allow matching of bright colors at reduced pigment cost or production of intense colors with better depth of color.

There is a particular need for weatherable ASA plastics which allow matching of bright colors at reduced pigment cost or production of bright intense colors with better depth of color with reduced pigment usage while maintaining other desirable properties. Weatherable ASA materials with improved translucency that reduces opacity, resulting in better colorability can be prepared from SAN copolymer grafted alkyl acrylate rubber, preferably butyl acrylate rubber, with a matrix rigid phase prepared from polymethyl methacrylate (PMMA) and methyl methacrylate-styrene-acrylonitrile (MMASAN) terpolymer.

SUMMARY OF THE INVENTION

In one embodiment the present invention generally provides for an acrylate-styrene-acrylonitrile type (ASA) composition comprising:

a) a matrix phase comprising (i) a terpolymer of a vinyl carboxylic acid ester monomer, a vinyl aromatic monomer and a vinyl cyanide monomer and (ii) a polymethylmethacrylate (PMMA); and b) a graft copolymer comprising (i) a substrate rubber and (ii) a superstrate copolymer, wherein the substrate rubber comprises a rubber derived from a vinyl carboxylic acid ester monomer and wherein the superstrate copolymer comprises a copolymer derived from both a vinyl aromatic monomer and a vinyl cyanide monomer, wherein the matrix phase is present at a weight percent level of from about 75 to about 25 weight percent of the total weight of the composition; and wherein the graft copolymer is present at a level of from about 25 to about 75 weight percent of the total weight of the composition, and the substrate rubber is present at a level of from about 5 to about 55 weight percent of the total weight of the composition.

In another embodiment the present invention generally provides for an acrylate-styrene-acrylonitrile type (ASA) composition comprising:

a) a continuous phase or matrix, frequently denoted a "rigid matrix phase," comprising a mixture of:

1) MMASAN, a terpolymer of methyl methacrylate and styrene acrylonitrile ranging in weight percent composition of the continuous rigid phase of from about 90 weight percent to about 10 weight percent; and 2) PMMA, a homopolymer of methylmethacrylate, polymethylmethacrylate, ranging in weight percent composition of the continuous phase of from about 10 weight percent to about 90 weight percent; and b) a discontinuous phase, dispersed in the continuous phase, comprising:

1) a core graft rubber where the core is butyl acrylate rubber comprising from about 15 to about 90 weight percent of the total core graft disperse phase and 2) a graft or superstrate polymer of styrene acrylonitrile (SAN) comprising from about 85 to about 10 weight percent of the total core graft disperse phase;

wherein the continuous or matrix phase comprises from about 90 to about 10 weight percent of the total composition; and wherein the dispersed or discontinuous phase comprises from about 10 to about 90 weight percent of the total composition.

DESCRIPTION OF THE PREFERRED EMBODIMENTS

Weatherable ASA polymers with improved translucency, better colorability and color matching, reduced pigment costs and other desirable physical properties are prepared from poly (alkyl acrylate) rubber based ASA graft phase in combination with a vinyl aromatic/vinyl cyanide/vinyl carboxylic acid ester matrix phase.

As used herein, the terms "weatherable" and "weatherability" refer to the ability or property of a material to effectively withstand the conditions of an outdoor environment over a long period of time (years) with substantially no degradation or decomposition, that is, resistance to UV radiation and to exposure to cyclic variations in temperature and humidity.

The ASA polymers of the present invention comprise a two phase system. The two phase system comprises an acrylate rubber substrate, preferably poly (butyl acrylate) rubber, with a superstrate (or graft) copolymer of styrene-acrylonitrile (SAN) attached to it. This phase is commonly referred to as the "rubber graft phase" because the SAN is physically attached or grafted to the rubber through chemical reaction. A "rigid matrix phase" or continuous phase of PMMA/MMASAN is utilized. The rubber graft phase (or dispersed phase) is dispersed throughout the matrix phase PMMA/MMASAN which forms the polymer continuum. The rubber interface is the surface forming the boundaries between the graft and matrix phases. The grafted SAN acts as a compatibilizer between the rubber and the matrix phase PMMA/MMASAN at this interface and prevents the separation of these two otherwise immiscible phases.

It has been found that there is a synergistic effect in reducing opacity of the blend when PMMA/MMASAN mixture is used as compared to using PMMA or MMASAN alone. Weatherable ASA blends with bright intense colors, reduced usage of color pigments and/or achievement of better depth of the color are possible utilizing existing inorganic pigments, organic pigments and dyes. In addition to improved translucency with better colorability, an improved weathering performance can also be expected for the mixture compared to MMASAN alone and improved physical properties can be expected for the mixture compared to PMMA alone.

The ASA type thermoplastic resins utilized by the present invention are graft copolymers of vinyl carboxylic acid ester monomers, vinyl aromatic monomers and vinyl cyanide monomers. Thus applicants define herein the phrase ASA type or acrylate-styrene-acrylonitrile type to include the group of polymers derived from vinyl carboxylic acid ester monomers, vinyl aromatic monomers and vinyl cyanide monomers as hereinafter defined. Vinyl carboxylic acid ester monomers (esters of alpha-, beta-unsaturated carboxylic acids) utilized in the present invention are herein defined by the following structural formula:

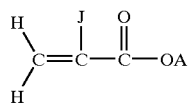

where J is selected from the group consisting of hydrogen, alkyl groups of from 1 to 8 carbon atoms, cycloalkyl, alkoxy and 1hydroxyalkyl and A is selected from the group consisting of alkyl groups of from 1 to 12 carbon atoms. Examples of vinyl carboxylic acid ester monomers include butyl acrylate, methyl methacrylate, methyl acrylate, ethyl methacrylate, ethyl acrylate, butyl methacrylate, propyl methacrylate, propyl acrylate, hexyl methacrylate, 2-ethylhexyl acrylate, 2-ethylhexyl methacrylate, decyl methacrylate, methyl ethacrylate, butyl ethacrylate, cyclohexyl methacrylate, methoxyethyl acrylate, hydroxyethyl methacrylate and mixtures thereof. The vinyl aromatic monomers are herein defined by the following structural formula:

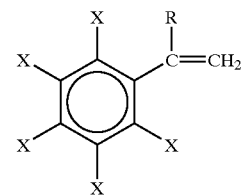

where each X is independently selected from the group consisting of hydrogen, alkyl groups of from 1 to 5 carbon atoms, cycloalkyl, aryl, alkaryl, aralkyl, alkoxy, aryloxy, hydroxy and halogen and where R is selected from the group consisting of hydrogen, alkyl groups of from 1 to 5 carbon atoms, bromine and chlorine. Examples of substituted vinyl aromatic monomers include styrene, 4-methyl-styrene, vinyl xylene, trimethyl-styrene, 3,5-diethyl-styrene, p-tert-butyl-styrene, 4-n-propyl-styrene, α-methyl-styrene, α-ethyl-styrene, α-methyl-p-methyl-styrene, p-hydroxy-styrene, methoxy-styrenes, chloro-styrene, 2-methyl-4-chloro-styrene, bromo-styrene, α-chloro-styrene, α-bromo-styrene, dichloro-styrene, 2,6-dichloro-4-methyl-styrene, dibromo-styrene, tetrachloro-styrene and mixtures thereof. Vinyl cyanide monomers are herein defined by the following structural formula:

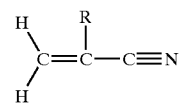

where R is selected from the group consisting of hydrogen, alkyl groups of from 1 to 5 carbon atoms, bromine and chlorine. Examples of vinyl cyanide monomers include acrylonitrile, methacrylonitrile, ethacrylonitrile, α-chloroacrylonitrile and α-bromoacrylonitrile.

It will be understood that by the use of "monomers" are included all of the polymerizable species of monomers and copolymers typically utilized in polymerization reactions, including by way of example monomers, homopolymers of primarily a single monomer, copolymers of two or more monomers, terpolymers of three monomers and physical mixtures thereof.

Various monomers may be further utilized in addition to or in place of those listed above to further modify various properties of the compositions disclosed herein. In general, the components of the present invention may be compounded with a copolymerizable monomer or monomers within a range not damaging the objectives and advantages of this invention. For example, the rubber phase may in addition to or in place of butyl acrylate rubber be comprised of polybutadiene, styrene-butadiene or butadiene-acrylonitrile copolymers, polyisoprene, EPM (ethylene/propylene rubbers), EPDM rubbers (ethylene/propylene/non-conjugated diene rubbers) and other crosslinked acrylate and alkylacrylate rubbers based on $C_1$–$C_{12}$ acrylates and alkylacrylates, either alone or as a mixture of two or more kinds. Furthermore, the rubber may comprise either a block or random copolymer. In addition to or in place of the acrylate, styrene and acrylonitrile monomers used in the graft or matrix resins, monomers including vinyl carboxylic acids such as acrylic acid, methacrylic acid and itaconic acid, acrylamides such as acrylamide, methacrylamide and n-butyl acrylamide, alpha-, beta-unsaturated dicarboxylic anhydrides such as maleic anhydride and itaconic anhydride, imides of alpha-, beta-unsaturated dicarboxylic acids such as maleimide, N-methylmaleimide, N-ethylmaleimide, N-alkyl maleimide, N-aryl maleimide and the halo substituted N-alkyl N-aryl maleimides, imidized polymethyl methacrylates (polyglutarimides), unsaturated ketones such as vinyl methyl ketone and methyl isopropenyl ketone, alpha-olefins such as ethylene and propylene, vinyl esters such as vinyl acetate and vinyl stearate, vinyl and vinylidene halides such as the vinyl and vinylidene chlorides and bromides, vinyl-substituted condensed aromatic ring structures such as vinyl naphthalene and vinyl anthracene and pyridine monomers may be used, either alone or as a mixture of two or more kinds.

In one embodiment, the rubbers are cross-linked poly (alkyl acrylate) rubbers and poly (alkyl alkylacrylate) rubbers. In other embodiments, the rubbers are poly (butyl acrylate), poly (ethyl acrylate) and poly (2-ethylhexyl acrylate) rubbers. In yet another embodiment, the rubber is poly (butyl acrylate) rubber, particularly poly (n-butyl acrylate) rubber.

Various methods of preparation of suitable cross-linked poly (alkyl acrylate) rubbers are well known in the art, for example via aqueous emulsion or suspension processes. By way of illustration, one method of preparing a poly (alkyl acrylate) rubber suitable for use in the present invention is via continuous emulsion polymerization of a monoethylenically unsaturated vinyl carboxylic acid ester monomer, a polyethylenically unsaturated monomer, a surfactant and a polymerization initiator.

In one embodiment, the monoethylenically unsaturated vinyl carboxylic acid ester monomer utilized for preparation of the rubber graft phase is selected from $(C_1–C_{12})$ alkyl acrylate and $(C_1–C_{12})$ alkyl $(C_1–C_8)$ alkylacrylate monomers and mixtures thereof. In another embodiment, it is selected from $(C_1–C_{12})$ alkyl acrylate monomers and mixtures thereof. As used herein, the terminology "monoethylenically unsaturated" means having a single site of ethylenic unsaturation per molecule and the terminology "alkyl acrylate monomers" refers collectively to vinyl carboxylic acid ester acrylate monomers and alkylacrylate monomers and the terminology "$(C_x–C_y)$", as applied to a particular unit, such as, for example, a chemical compound or a chemical substituent group, means having a carbon atom content of from x carbon atoms to y carbon atoms per such unit, for example, "$(C_1–C_{12})$alkyl" means a straight or branched alkyl substituent group having from 1 to 12 carbon atoms per group and includes, e.g., methyl, ethyl, n-butyl, isobutyl, sec-butyl, t-butyl, n-propyl, isopropyl, pentyl, hexyl, heptyl, octyl, nonyl, decyl, undecyl and dodecyl.

As used herein, the terminology "polyethylenically unsaturated" means having two or more sites of ethylenic unsaturation per molecule. A polyethylenically unsaturated monomer is used in the alkyl, acrylate rubbers of the present invention to provide "crosslinking" of the poly (alkyl acrylate) rubber particles formed in the process and to provide "graftlinking" sites in the poly (alkyl acrylate) rubber for subsequent reaction with grafting monomers. In one embodiment, the polyethylenically unsaturated crosslinking monomers contain at least two ethylenically unsaturated sites per molecule that have a reactivity that is similar, under the polymerization conditions utilized, to that of the monoethylenically unsaturated alkyl acrylate monomer. In another embodiment, the graftlinking monomers include those monomers having at least one site of ethylenic unsaturation that have a reactivity that is similar, under the emulsion or other polymerization conditions used, to that of the alkyl acrylate monomer and at least one other site of ethylenic unsaturation having a reactivity that is substantially different, under the emulsion polymerization conditions used in the process of the present invention, from that of the monoethylenically unsaturated alkyl acrylate monomer, so that at least one unsaturated site per molecule of graftlinking monomer reacts during synthesis of the rubber latex and at least one other unsaturated site per molecule of graftlinking monomer remains unreacted following synthesis of the rubber latex and is thus remains available for subsequent reaction under different reaction conditions.

In yet another embodiment, the polyethylenically unsaturated monomers include, for example, butylene diacrylate, divinyl benzene, butene diol dimethacrylate, trimethylolpropane tri(meth)acrylate, allyl methacrylate, diallyl maleate, triallyl cyanurate and mixtures thereof. In a preferred embodiment, triallyl cyanurate is used as both a crosslinking monomer and a graftlinking monomer.

In various embodiments, the feed streams to the reactor vessel and the reaction mixture contain from about 0.01 to 4 pbw or from about 0.1 to 1.5 pbw, polyethylenically unsaturated monomer per 100 pbw monoethylenically unsaturated alkyl acrylate (vinyl carboxylic acid ester) monomer.

In various embodiments of the present invention, the monoethylenically unsaturated alkyl acrylate monomer utilized in the emulsion is selected to provide a poly(alkyl acrylate) rubber having a glass transition temperature (Tg) of less than or equal to 25° C. or less than or equal to 0° C. or less than or equal to −30° C. As referred to herein, the $T_g$ of a polymer is the $T_g$ value of polymer as measured by differential scanning calorimetry (heating rate 20° C./minute, with the $T_g$ value being determined at the inflection point).

Minor amounts, such as, for example, up to about 25 pbw per 100 pbw of the total amount of monomers, of other unsaturated monomers that are copolymerizable with the alkyl acrylate monomer used in the present invention may optionally be included in the reaction mixture, provided that the limitation regarding the $T_g$ of the rubber latex is satisfied. Suitable copolymerizable monomers include, for example, monoethylenically unsaturated carboxylic acids, hydroxy $(C_1–C_{12})$ alkyl methacrylate monomers, $(C_4–C_{12})$ cycloalkyl (meth)acrylate monomers, acrylamide monomers, maleimide monomers and vinyl esters. As used herein, the term "$(C_4–C_{12})$ cycloalkyl" means a cyclic alkyl substituent group having from 4 to 12 carbon atoms per group and the term "acrylamide" refers collectively to acrylamides and methacrylamides. Also suitable are vinyl aromatic monomers such as, for example, styrene and substituted styrenes having one or more alkyl, alkoxy, hydroxy or halo substituent group attached to the aromatic ring.

The surfactant is for example one or more compounds according to formula R—SO₃M or R—SO₄M wherein R is alkyl, and M is a hydrogen radical or a cation. In a preferred embodiment, R is $(C_1–C_{30})$alkyl, more preferably $(C_6–C_{30})$ alkyl, and M is a metal cation, an ammonium cation, an alkyl ammonium cation or an alkoxy ammonium cation. Suitable metal cations include, for example, sodium, potassium, lithium and magnesium cations. Suitable alkyl ammonium cations include, for example, diethyl ammonium and tetraethyl ammonium cations. Suitable alkoxy ammonium cations, include, for example, diethanol ammonium and tetraethanol ammonium cations.

Suitable surfactants include, for example, sodium lauryl sulfate, sodium decyl sulfate, sodium 2-ethylhexyl sulfate, potassium lauryl sulfate, ammonium lauryl sulfate, diethanol ammonium lauryl sulfate, tetraethanol ammonium lauryl sulfate, sodium eicosyl sulfonate and sodium paraffin sulfonate. In one embodiment, the surfactants are non-ionic surfactants consisting of addition products of ethylene oxide disclosed in U.S. Pat. No. 4,357,270 (1982) to Pippa et al. The surfactants consist of adducts of ethylene oxide with various organic compounds containing in the molecule reactive hydrogen atoms, such as alkylphenols having from 8 to 12 carbon atoms in the alkyl, aliphatic alcohols having from 12 to 18 carbon atoms, long chain fatty acids and alicyclic carboxylic acids of the type of abietic acid, tall oil, esters of long chain fatty acids, such as mono- and diglycerides, castor oil and esters of 1,4-sorbitan. The number of ethylene oxide molecules present in the molecule of the adduct varies, in general, from 10 to 100; but may also be greater.

As non-ionic surfactants there may also be used ethylene oxide/propylene oxide copolymers containing a percentage by weight of ethylene oxide comprising between 30 and 95%. Examples of non-ionic ethylene oxide addition products surfactants include the addition products of nonylphenol with 9, 20, 40 and 100 moles of ethylene oxide, the addition product of oleyl alcohol with 55 moles of ethylene oxide and the addition product of 1,4-sorbitan stearate with 20 moles of ethylene oxide, and particularly the adducts of nonylphenol with more than 20 moles of ethylene oxide.

The one or more initiators used in the preparation of the acrylate rubber are preferably selected from a conventional free radical initiators such as, for example, an organic peroxide compound, such as, for example, benzoyl peroxide, a persulfate compound, such as, e.g., potassium persulfate, an azonitrile compound such as, for example, 2,2'-azobis-2,3,3-trimethylbutyronitrile, or a redox initiator system, such as, for example, a combination of a peroxide or hydroperoxide, such as for example, hydrogen peroxide, cumene hydroperoxide or t-butyl hydroperoxide, an oxidizing agent, such as for example, ferrous sulfate, a chelating agent such as, for example, tetrasodium pyrophosphate, ethylene diamine tetraacetic acid or a salt of ethylene diamine tetraacetic acid, and a reducing agent, such as for example, sodium formaldehyde sulfoxylate or a reducing sugar.

In one embodiment, the redox initiator system comprises a combination of cumene hydroperoxide, ferrous sulfate, a chelating agent, preferably, the disodium salt of ethylene diamine tetraacetic acid and sodium formaldehyde sulfoxylate as the polymerization initiator. In a second embodiment, the redox initiator system contains from 0.05 to 0.5 pbw cumene hydroperoxide per 100 pbw of the vinyl carboxylic acid ester monoethylenically unsaturated alkyl methacrylate monomer, an amount of sodium formaldehyde sulfoxylate effective to provide a sodium formaldehyde sulfoxylate-:cumene hydroperoxide molar ratio of about 0.9:1 to 1:1.1, from 0.1 to 10 pbw of the disodium salt of ethylene diamine tetraacetic acid per 100 pbw cumene hydroperoxide and from 0.1 to 10 pbw ferrous sulfate per 100 pbw cumene hydroperoxide.

In one embodiment, the poly(butyl acrylate) rubber latex particles of the present invention have a weight average particle size of 2700 angstroms, as measured by light transmission. The size of emulsion polymerized rubber particles may optionally be varied according to known process techniques. The poly (butyl acrylate) in one embodiment has a weight average molecular weight of from about 100,000 to about 130,000.

Vinyl aromatic and vinyl cyanide monomers or copolymers are grafted to poly(alkyl acrylate) rubber particles made via the example process above or via one of the many other processes known to the art to thereby form a graft phase copolymer having a poly(alkyl acrylate) rubber chemically grafted to the vinyl aromatic-vinyl cyanide. Again, the many different processes known to the art may be utilized to form the graft phase copolymer, for example bulk, emulsion, emulsion-suspension or emulsion-mass polymerization. In one embodiment, a poly(butyl acrylate) rubber is grafted with styrene-acrylonitrile (SAN) to form the ASA rubber graft phase.

In one embodiment, the rigid matrix phase comprises a terpolymer derived from monomers selected from the group consisting of vinyl carboxylic acid ester monomers, vinyl aromatic monomers and unsaturated nitrile monomers. In another embodiment, the mixture comprises polymethyl methacrylate (PMMA) homopolymer and methyl methacrylate-styrene-acrylonitrile (MMASAN) terpolymer.

In one embodiment, the vinyl carboxylic acid ester for use as one component of the matrix phase of the present invention comprises methyl methylacrylate in the form of polymethyl methacrylate (PMMA). Use of commercially available, easily utilized PMMA in conjunction with MMASAN allows greater flexibility in adjusting the percentage composition of methyl methacrylate in the matrix phase as well as allowing use of PMMA with varying molecular weights, modifying monomers, etc.

As is well known in the art, PMMA may be produced by the polymerization of methyl methacrylate monomer to form a homopolymer. PMMA homopolymer exists in its pure form only theoretically and is generally available commercially as a mixture of the homopolymer and with one or more copolymers of methyl methacrylate with $C_1$–$C_4$ alkyl acrylates, such as ethyl acrylate. Such commercially available PMMA copolymers contain methyl methacrylate and from about 1 percent to about 30 percent by weight of one or more $C_1$–$C_4$ alkyl acrylates. Such PMMA homopolymers are suitable for use in the present invention as the vinyl carboxylic acid ester monomer component. Copolymers of PMMA with minor amounts of one or more copolymerizable monomers are also intended to be encompassed, e.g., the copolymer of methyl methacrylate with styrene and/or acrylonitrile. The molecular weight of the polymethylmethacrylate polymer can range from 50,000 to 450,000, preferably from about 100,000 to about 250,000 as a weight average molecular weight.

In various embodiments the ASA polymers comprises about 10 percent to about 40 percent or about 15 percent to about 30 percent or about 15 percent to about 25 percent of poly (butyl acrylate) rubber.

In one embodiment, the rubber graft phase comprises from about 20% poly(butyl acrylate) to about 70% poly (butyl acrylate). In another embodiment, the rubber graft phase comprises about 45% poly (butyl acrylate) rubber and 55% SAN, with the SAN portion of the graft phase made from styrene and acrylonitrile in amounts in a range of 65% styrene and 35% acrylonitrile to 75% styrene and 25% acrylonitrile. In yet another embodiment, the SAN portion of the graft phase comprises about 70–75% styrene and about 25–30% acrylonitrile.

It will be appreciated that, in general, the particle size of the rubber in the emulsion during the graft polymerization reactions has an effect upon the optimum grafting level for the graft copolymer. A given weight percentage of smaller size rubber particles will provide considerably greater surface area for grafting than the equivalent weight of a larger size rubber particle. Accordingly, the density of grafting will be varied depending upon the size of the rubber particle. Generally, the smaller rubber particles will tolerate a higher superstrate/substrate ratio than larger size particles to give generally comparable results.

In one embodiment, the MMASAN comprises 80% MMA, 15% styrene and 5% acrylonitrile. In another embodiment, the MMASAN comprises about 60% MMA, 30% styrene and 10% acrylonitrile. In a third embodiment, the MMASAN comprises about 45% methyl methacrylate, 40% styrene and 150/a acrylonitrile. In one embodiment, the PMMA/MMASAN ratio in the matrix phase copolymer ranges from about 20/80 to about 80/20; and in another embodiment, from 25/75 to about 75/25 including 50/50.

The ASA polymer in one embodiment comprises of ratios of graft phase to matrix phase of 15/85 to 75/25. and in another embodiment, about 45% graft phase and 55% matrix phase. The graft copolymer phase may be coagulated, blended and collided with the matrix phase homopolymers, copolymers and/or terpolymers by the various blending processes which are well known in the art to form the ASA polymer blend.

Pigments suitable for use in the present invention include, by way of example, furnace black, inorganic pigments including aluminates such as cobalt aluminate blues, ceramic pigments such as the manganese violets, chromates such as chrome yellow and orange (lead chromates, optionally with lead sulfate), zinc yellow (zinc chromate), molybdate orange (lead chromate and sulfide and lead molybdate), chrome greens (greenish chrome yellow pigments with iron blues), iron blues (based on ferric ammonium ferrocyanide), oxides such as iron oxide (from yellow to black, particularly the browns or buffs and reds), chromium oxide greens (anhydrous), sulfides or cadmiums such as cadmium sulfide (orange or yellow with zinc sulfide), cadmium sulfoselenide (reds and oranges), cadmium mercury (mercadmiums), cadmium-lithium compounds and lithopones (barium sulfate extended versions of cadmium sulfide and cadmium sulfoselenide), titanates such as nickel titanate (a yellow colorant), titanium dioxides (whites including the rutiles and the anatase pigments), zinc sulfide white, ultramarine blues (aluminosilicate complex containing sulfur) and cobalt blue (a mixture of ultramarine blue and zinc oxides).

Suitable organic dyes and pigments include, for example, quinophthalone, isodolines, perylenes for yellows, diketopyrrolo-pyrrole, a cadmium-type red, high temperature versions of organic pigments such as azoic reds and yellows including azo compounds and acid azo pigments, quinacridones, phthalocyanine blues or greens, anthraquinone dyes, scarlet 3b Lake, chromophthalocyanine pyrroles, halogenated phthalocyanines, quinolines, heterocyclic dyes, perinone dyes, anthracenedione dyes, thioxanthene dyes, pyrazolone dyes, polymethine pigments, blends of organic and inorganic mixed metal oxide pigments and others.

Suitable special effect colorants include metallics such as aluminum flake and gold bronzes, pearlescents, granites, fluorescents, phosphorescent pigments such as zinc sulfides or alkaline earth aluminate oxides, luminescents, thermochromics and photochromics. Such pigments may be utilized alone or as a mixture of two or more kinds, as dry colorants, liquid colorants, color concentrates, encapsulated pigments, pigment dispersions, universal concentrates, freeze-dried concentrates and multifunctional concentrates.

There may optionally be added to the resin phases, during or after formation, such additives as chain transfer agents, heat and ultraviolet light stabilizers, UV absorbers, antioxidants, lubricants, flow aids, mold or metal release agents, antistatic agents, flame and fire retardants, plasticizers, drip suppressants, mineral additives and fillers, reinforcing agents, and the like.

The present ASA compositions can be molded, extruded and/or otherwise formed into weatherable, impact resistant articles. For example, the present compositions can be used to produce articles such as window coverings, house sidings, exterior automotive parts and other articles which are resistant to the effects of weather on a long term basis and, therefore, can be employed out-of-doors. Such finished products can include only the compositions of the present invention alone or they can be composites of the present compositions with other materials, such as wood, glass, additional polymeric materials, other fillers and the like.

The following examples are presented as illustrations of the preparation and utility of the present compositions. The examples are not intended in any way to limit the spirit and scope of the invention.

EXAMPLES 1–5

Blends of polymethyl methacrylate (PMMA) with methyl methacrylate-styrene-acrylonitrile terpolymer were used as matrix for SAN grafted poly(butyl acrylate) dispersed rubbery graft phase. The examples illustrate the use of three appropriate ASA/PMMA/MMASAN compositions in parts by weight and advantages of the present invention as compared to ASA/PMMA and ASA/MMASAN formulations. The compositions were subjected to measurement of opacity values and found to have an opacity of less than 91 percent at ⅛ inch thickness. Opacity as herein defined is measured on a 25D Hunter Colorimeter and expressed as a percent.

A rubber graft (hereinafter ASA Rubber Graft) of 45% poly(butyl acrylate) rubber and 55% SAN (72% styrene and 28% acrylonitrile) was utilized for the dispersed rubbery phase. All examples were formulated such that the ASA comprised 20% poly(butyl acrylate) rubber (i.e., about 44.4 percent graft phase and 55.6 percent matrix phase). MMASAN of 45% methyl methacrylate, 40% styrene and 15% acrylonitrile by weight was utilized in the examples below.

TABLE I

| Example | Formulation | PMMA/MMASAN | Opacity |
| --- | --- | --- | --- |
| 1 | ASA/PMMA/MMASAN | 75/25 | 90.21 |
| 2 | ASA/PMMA/MMASAN | 50/50 | 89.11 |
| 3 | ASA/PMMA/MMASAN | 25/75 | 90.80 |
| 4 | ASA/PMMA | 100/0 | 92.98 |
| 5 | ASA/MMASAN | 0/100 | 94.18 |

20% butyl acrylate rubber for all samples
Lower opacity indicates better colorability No limitation with respect to the specific embodiments disclosed herein is intended or should be inferred. As those skilled in the art, upon attaining an understanding of the invention, may readily conceive of alterations to, modifications of, and equivalents to the preferred embodiments without departing from the principles of the invention, it is intended to cover all these alternatives, modifications and equivalents. For example, the ASA components and compositions of the present invention may be made by various processes and modified with other rubbers and monomers.

What is claimed is:

1. An acrylate-styrene-acrylonitrile type (ASA) composition comprising:
    a) a matrix phase comprising (i) a terpolymer of a vinyl carboxylic acid ester monomer, a vinyl aromatic monomer and a vinyl cyanide monomer and (ii) a polymethylmethacrylate (PMMAV); and b) a graft copolymer comprising (i) a substrate rubber and (ii) a superstrate copolymer, wherein the substrate rubber comprises a rubber derived from a vinyl carboxylic acid ester monomer and wherein the superstrate copolymer comprises a copolymer derived from both vinyl aromatic monomer and a vinyl cyanide monomer, wherein the matrix phase is present at a weight percent level of from about 75 to about 25 weight percent of the total weight of the composition; and wherein the graft copolymer is present at a level of from about 25 to about 75 weight percent of the total weight of the composition, and the substrate rubber is present at a level of from about 5 to about 55 weight percent of the total weight of the composition.

2. The ASA composition of claim 1, wherein the graft copolymer comprises about 75 to about 25 weight percent of the substrate rubber and about 25 to about 75 weight percent of the superstrate copolymer.

3. The ASA composition of claim 1, wherein the vinyl carboxylic acid ester-vinyl aromatic-vinyl cyanide terpolymer is MMASAN.

4. The ASA composition of claim 3 wherein the PMMA comprises from about 20 to about 80 weight percent of the matrix phase and the MMASAN comprises about 80 to about 20 weight percent of the matrix phase.

5. The ASA composition of claim 3 wherein the rangers of MMA:S:AN in the MMASAN are about 80/15/15 to 30/50/20.

6. The ASA composition of claim 1, wherein the vinyl carboxylic acid ester monomer of the substrate rubber is butyl acrylate, the vinyl aromatic monomer of the superstrate copolymer is styrene, and the vinyl cyanide monomer of the superstrate copolymer is acrylonitrile.

7. The ASA composition of claim 1, wherein the vinyl carboxylic acid ester monomer of the matrix phase is methyl methacrylate, the vinyl aromatic monomer of the matrix phase is styrene, the vinyl cyanide monomer of the matrix phase is acrylonitrile, the vinyl carboxylic acid ester monomer of the substrate rubber is butyl acrylate, the vinyl aromatic monomer of the superstrate copolymer is styrene, and the vinyl cyanide monomer of the superstrate copolymer is acrylonitrile.

8. The ASA composition of claim 1, wherein the composition is characterized by an opacity of less than 91 percent.

9. The ASA composition of claim 1, wherein the composition further comprises a colorant selected from the group consisting of dry colorants, liquid colorants, color concentrates, encapsulated pigments, pigment dispersions, universal concentrates, freeze-dried concentrates, multifunctional concentrates and physical mixtures thereof.

10. An acrylate-styrene-acrylonitrile type composition comprising:

a) a matrix phase comprising (A) a polymethylmethacrylate (PMMA), and (B) terpolymer derived from a vinyl carboxylic acid ester monomer, a vinyl aromatic monomer and a vinyl cyanide monomer, wherein the matrix composition of A:B is such that said composition has an opacity of less than about 91%; and b) a graft copolymer comprising a substrate rubber and a superstrate copolymer, wherein the substrate rubber comprises a rubber derived from a vinyl carboxylic acid ester monomer and the superstrate copolymer comprises a copolymer derived from both a vinyl aromatic monomer and a vinyl cyanide monomer;

wherein the matrix phase is present at a weight percent level of from about 25 to about 75 percent by weight based on the total weight of the composition, and wherein the graft copolymer is present at a level of from about 25 to 75 weight percent of the total weight of the composition, and the substrate rubber is present at a level of from about 10 percent to about 40 weight percent of the total weight of the composition.

11. The ASA composition of claim 10, wherein the graft copolymer comprises about 75 to about 25 weight percent of the substrate rubber and about 25 to about 75 weight percent of the superstrate copolymer.

12. The ASA composition of claim 10, wherein the vinyl carboxylic acid ester-vinyl aromatic-vinyl cyanide terpolymer is MMASAN.

13. The ASA composition of claim 10, wherein the vinyl carboxylic acid ester monomer of the substrate rubber is butyl acrylate, the vinyl aromatic monomer of the superstrate copolymer is styrene, and the vinyl cyanide monomer of the superstrate copolymer is acrylonitrile.

14. The ASA composition of claim 12, wherein the ranges of MMA:S:AN in the MMASAN are between about 85/15/15 and about 30/50/20.

15. The ASA composition of claim 10 wherein the composition further comprises a colorant selected from the group consisting of dry colorants, liquid colorants, color concentrates, encapsulated pigments, pigment dispersions, universal concentrates, freeze-dried concentrates, multifunctional concentrates and physical mixtures thereof.

16. A method to improve the translucency of an acrylate-styrene-acrylonitrile type composition, said method comprising:

a) blending about: (i) 25 to about 75 percent of a matrix phase comprising (A) a polymethylmethacrylate (PMMA), and (B) a terpolymer derived from a vinyl carboxylic acid ester monomer, a vinyl aromatic monomer and a vinyl cyanide monomer and (ii) about 25 to 75 weight percent of a graft copolymer comprising a substrate rubber and a superstrate copolymer, wherein the substrate rubber comprises a rubber derived from a vinyl carboxylic acid ester monomer and the superstrate copolymer comprises a copolymer derived from both a vinyl aromatic monomer and a vinyl cyanide monomer; and b) adjusting the ratio of A:B in said matrix phase such that said acrylate-styrene-acrylonitrile type composition has an opacity of less than about 91%.

17. The method of claim 16, wherein the graft copolymer comprises about 60 to about 30 weight percent of the substrate rubber and about 40 to about 70 weight percent of the superstrate copolymer; and the vinyl carboxylic acid ester-vinyl aromatic-vinyl cyanide terpolymer of the matrix phase is MMASAN.

18. The method of claim 17, wherein the ranges of MMA:S:AN in the MMASAN are between about 85/15/15 to about 30/50/20.

* * * * *